(12) United States Patent
Gade et al.

(10) Patent No.: US 8,713,192 B2
(45) Date of Patent: Apr. 29, 2014

(54) SYSTEM AND METHOD FOR ROUTING STREAMING DATA REQUESTS

(75) Inventors: Bhargavaram Gade, Irving, TX (US); Justin Madison, Garland, TX (US)

(73) Assignee: Yahoo! Inc., Sunnyvale, CA (US)

( * ) Notice: Subject to any disclaimer, the term of this patent is extended or adjusted under 35 U.S.C. 154(b) by 1265 days.

(21) Appl. No.: 11/608,649

(22) Filed: Dec. 8, 2006

(65) Prior Publication Data

US 2008/0140850 A1    Jun. 12, 2008

(51) Int. Cl.
*G06F 15/16* (2006.01)
(52) U.S. Cl.
USPC ............................................ 709/231; 709/232
(58) Field of Classification Search
USPC ................................................. 709/231, 232
See application file for complete search history.

(56) References Cited

U.S. PATENT DOCUMENTS

| | | | | |
|---|---|---|---|---|
| 6,240,169 B1 * | 5/2001 | Haskins et al. | ........... | 379/114.02 |
| 6,522,658 B1 * | 2/2003 | Roccanova | ................... | 370/441 |
| 6,628,649 B1 * | 9/2003 | Raj et al. | ........................ | 370/360 |
| 7,072,331 B2 * | 7/2006 | Liu et al. | ........................ | 370/352 |
| 7,216,168 B2 * | 5/2007 | Merriam | ........................ | 709/224 |
| 7,593,865 B2 * | 9/2009 | Cirulli et al. | ............... | 705/26.61 |
| 7,650,421 B2 * | 1/2010 | Patrick et al. | ................. | 709/231 |
| 2002/0064149 A1 * | 5/2002 | Elliott et al. | ................... | 370/352 |
| 2003/0043785 A1 * | 3/2003 | Liu et al. | ........................ | 370/352 |
| 2003/0101278 A1 * | 5/2003 | Garcia-Luna-Aceves et al. | ............................. | 709/240 |
| 2003/0141093 A1 * | 7/2003 | Tirosh et al. | ................. | 174/72 A |
| 2004/0153792 A1 * | 8/2004 | Merriam | .......................... | 714/26 |
| 2006/0182034 A1 * | 8/2006 | Klinker et al. | ................. | 370/238 |

* cited by examiner

*Primary Examiner* — Umar Cheema
(74) *Attorney, Agent, or Firm* — James J. DeCarlo; Greenberg Traurig, LLP

(57) ABSTRACT

Against this backdrop systems and methods have been developed for selecting a least-cost transmission route for streaming data between a server and client. In an embodiment, a client sends a request for data to a gateway. The gateway maintains information regarding the servers available to stream the data and the costs associated with the different networks available between the servers and the client. From this information the gateway identified what transmission routes are available and selects the lowest cost transmission route for streaming the data. If comparable cost transmission routes are found, a selection is made based on secondary criteria. The client is the directed by the gateway to send a request to the appropriate server to stream the data via the selected transmission route.

20 Claims, 4 Drawing Sheets

SYSTEM AND METHOD FOR ROUTING STREAMING DATA REQUESTS

BACKGROUND

The streaming data over the Internet has become a popular way to view and consume media in modern society. In a typical system, a client computer sends a request to a server with the desired media to stream the data that makes up the media. In response, the server typically streams the data back to the client via the same transmission route the request was transmitted. For example, songs may be streamed to mobile devices over wireless networks and videos may be streamed to personal computers or other receivers via a high-speed Internet network such as a digital subscriber line (DSL), a cable modem or a T-1 network. As streaming data has become more popular, the load on the servers that actually stream data has increased significantly, which in turn has increased the bandwidth used by the servers to stream the data.

Servers are typically connected to multiple different computing networks, each of which being interconnected with other networks that together form accessible parts of the Internet. These networks and networks differ in their speed (bandwidth) and also in their cost. Some networks (sometimes referred to as "free-peer" networks or flat rate networks) are substantially free in that the operator of the server need only pay a small monthly flat rate subscriber fee and does not pay based on the amount of data transmitted via the network. Other networks charge by the amount of data transmitted over the network, in which case the cost of the network is a use-based cost.

For any given destination on the Internet for the streaming data, often there are multiple transmission routes via different networks between the server and the destination. However, typical servers do not take into account other possible transmission routes when streaming data back to a client on the Internet. The transmission route chosen for streaming the data is often the transmission route that the request for the data traveled to the server. In addition, modern server operators often have multiple servers located around the country and even the world. Currently, the selection of which server to actually serve the data is done solely based on the current load on each of the servers available, without taking into account the different costs associated with each server.

SUMMARY

Against this backdrop systems and methods have been developed for selecting a least-cost transmission route for streaming data between a server and client. In an embodiment, a client sends a request for data to a gateway. The gateway maintains information regarding the servers available to stream the data and the costs associated with the different networks available between the servers and the client. From this information the gateway identifies what transmission routes are available and selects the lowest cost transmission route for streaming the data. If comparable cost transmission routes are found, a selection is made based on secondary criteria. The client is the directed by the gateway to send a request to the appropriate server to stream the data via the selected transmission route.

In one aspect, the disclosure may be considered to describe a method of streaming data from a first server computing device to a client computing device. The method includes receiving a request to stream data to a client computing device. In response, a first transmission route is selected between the first server computing device and the client computing device from a set of available transmission routes between the first server computing device and the client computing device. The selection is made based on a cost of the first transmission route relative to the cost of the other available transmission routes. The data is then streamed from the first server computing device to the client computing device via the first transmission route.

In another aspect, the disclosure may be considered to describe a system for streaming data to a client computing device. The system includes a first server computing device having access to a copy of the data. A set of available transmission routes exists between the first server computing device and the client computing device over which the first server computing device can stream the data to the client computing device. The system further includes a gateway that receives a data request from the client computing device and that selects a first transmission route for transmission of the data. The first transmission route is selected from the set of available transmission routes between the first server computing device and the client computing. The gateway further selects the first transmission route from the set of available transmission routes based on a transmission cost associated with each of the set of available transmission routes.

In yet another aspect, the disclosure may be considered to describe a computer-readable medium encoding computer-executable instructions for performing a method of streaming data from a first server computing device to a client computing device. The method includes receiving a request to stream data to a client computing device and selecting a first transmission route between the first server computing device and the client computing device from a set of available transmission routes between the first server computing device and the client computing device based on a cost of the first transmission route relative to the cost of the other available transmission routes. The method further includes transmitting a response to the client computing device, the response directing the client computing device to transmit a direct request to the first server, in which the direct request is a request to stream the data to the client computing device via the first transmission route.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

Figure 1:
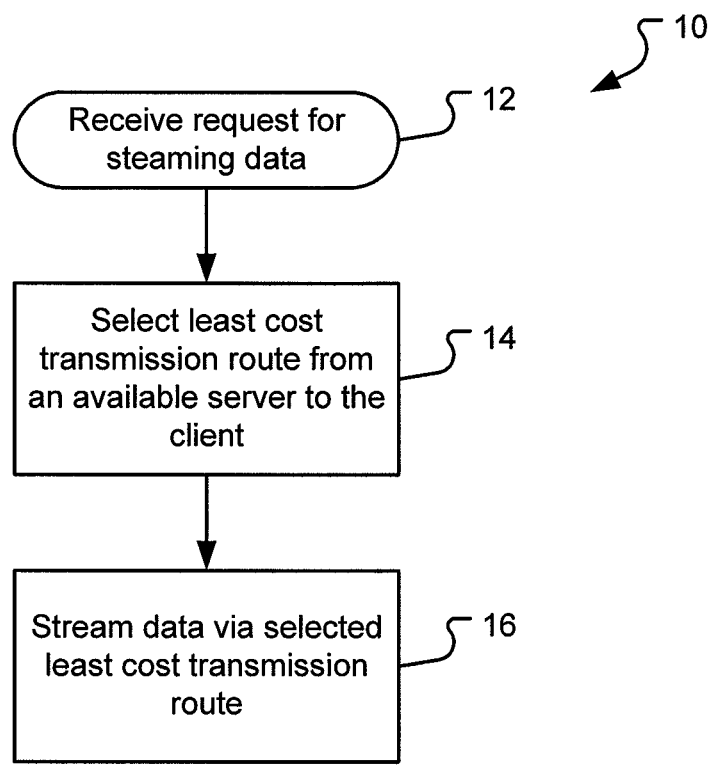
FIG. 1 illustrates a high-level embodiment of a method for streaming data from one computing device to another.

FIG. 1 illustrates a high-level embodiment of a method for streaming data from one computing device to another. To simplify the discussion below, the computing device requesting the data will be referred to as the client computing device, or simply the "client," and computing devices capable of streaming the data to the client will be referred to as server computing devices or, simply, servers. In the method 10, a request to stream data to the client is received in a receive request operation 12. The request may have been transmitted by the client or may have been received from another source. As discussed in greater detail below, the request may be received by one or more servers or may be received by an intermediate computing device such as the gateway discussed with reference to FIG. 2, below.

In response to the request, the system compares the costs of the available transmission routes at the system's disposal for streaming the requested data to the client and selects the lowest cost transmission route in a select transmission route operation 14. For example, as discussed above, servers typically are connected to multiple different networks that make up part of the Internet, each network possibly providing a different transmission route to the client. The cost of transmitting data via each network may differ, even though the destination (i.e., the client) is the same. Thus, there will be a different cost associated with each transmission route to the client. The select transmission route operation 14, then, determines what transmission routes are available, identifies the lowest cost transmission route of those available from data stored about the transmission routes and selects the lowest cost transmission route for streaming the data.

The select transmission route operation 14 may compare available transmission routes from many different and independent servers located in different places throughout the world. Thus, the method may include retrieving and comparing the costs of different transmission routes between many different servers in many different locations and the client computing device.

In an embodiment, the selection may be made based purely on cost. If different servers have substantially the same cost transmission routes, then other factors such as latency, distance between the server and client, and current server loads may be used in the selection process. In an alternative embodiment, the cost may be used as just one other factor in addition to factors such as latency, distance between the server and client, and current server loads when selecting the transmission route.

After selecting the transmission route, the data is then streamed to the client via the selected transmission route in a stream media operation 16. The method 10 reduces the cost associated with streaming media from servers.

Figure 2:
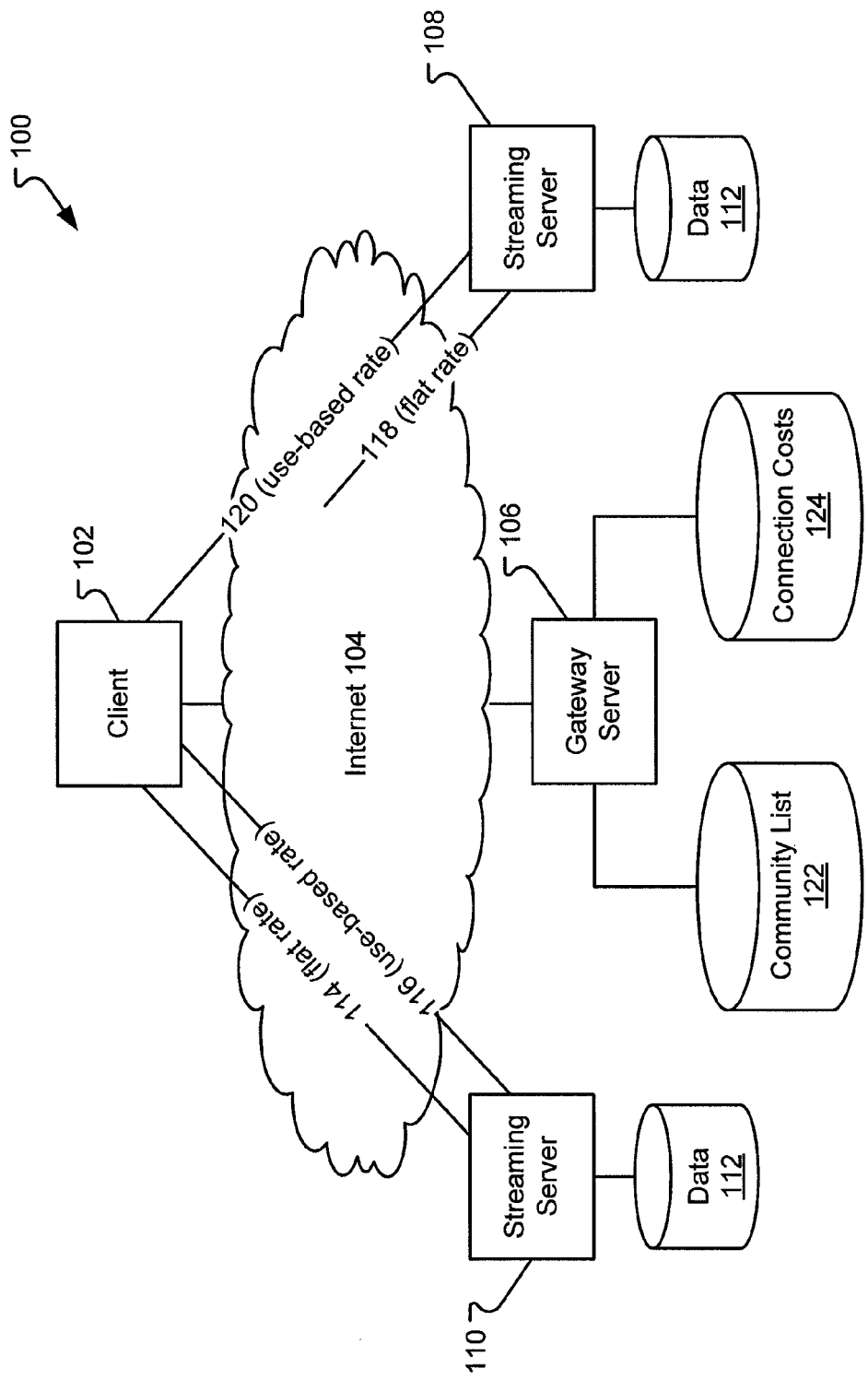
FIG. 2 is a computing architecture illustrating an embodiment of a system for routing streaming media.

FIG. 2 is a computing architecture illustrating an embodiment of a system for routing streaming media. Although numerous exemplary embodiments will be discussed in terms of streaming data for media content (referred to herein as streaming media), this system can also be utilized with any type of data that can be transmitted between computers so the term media should be broadly construed to encompass any type of data that can be requested and consumed by another computing device.

FIG. 2 illustrates a client-server architecture 100 in which a client computing device 102 (the "client" 102) communicates with one or more server computing devices 106, 108, 110 which are connected via a network 104 such as the Internet 104 as shown. Examples of client computing devices 102 and server computing devices 106 are well known in the art. In a client-server architecture, the term "client" is often used to identify a computing device that is requesting some type of service or data, in this case requesting the data to be streamed. The computing device that supplies the service or data is then often referred to as a server computing device, or simply as the "server." The client and server may, in fact, be identical computing devices, but are differentiated based on roles they are assuming during the particular transaction. Thus, a computing device that is a client in one transaction may simultaneously be a server in another transaction.

Computing devices such as the client 102 or server 106, 108, 110 includes a processor and memory for storing data and software. In an embodiment, computing devices are further provided with operating systems and can execute software applications in order to manipulate, transmit and receive data. In the computing device, local files, such as the requested media file 112, may be stored on a mass storage device (not shown) that is connected to or part of any of the computing devices described herein including the client 102 and servers 106, 108, 110. A mass storage device and its associated computer-readable media, provide non-volatile storage that can be accessed by one or more computing devices. Although the description of computer-readable media contained herein refers to a mass storage device, such as a hard disk or CD-ROM drive, it should be appreciated by those skilled in the art that computer-readable media can be any available media that can be accessed by a computing device.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Client-server architectures are well known in the art. Although a client 102 or server 106, 108, 110 may be a general purpose computing device as mentioned above, other specialized configurations may be used that increase the computing device's performance of a particular role (e.g., a client role or a server role). For example, although a client may take the form of any computing device with the appropriate communication capabilities, commonly a client 102 is a computing device, such as a personal computer (PC), web-enabled personal data assistant (PDA) or a smart phone. The client 102 may be connected to the Internet 104 via a wired data network or wireless network such as a wi-fi network, a WiMAX (802.16) network, a satellite network or cellular telephone network. The client 102 may include a video monitor or display that can render video to a user, a speaker for playing audio to the user, a microphone for receiving the audio from the user and a video camera for taking video of the user.

In the embodiment shown, the client 102 may include an Internet browser, such as that offered by Microsoft Corporation under the trade name INTERNET EXPLORER, or that offered by Netscape Corp. under the trade name NETSCAPE NAVIGATOR, or the software or hardware equivalent of the aforementioned components that enable networked intercommunication between users and service providers and/or among users.

The client 102 may also include a media engine (not shown). The media engine may be a software application, a hardware component or some combination of the two that is adapted to receive and handle media data. The media engine can cause stored or streaming media data to be rendered to the user via the video display and the speaker. In addition, the media engine may also be utilized in receiving media data from the microphone and the camera for storage or transmission to another device.

Likewise, a server 106, 108, 110 may take the form of a specialized computing device adapted to increase its performance in responding to requests. For example, specialized servers may be provided with multiple processors, high bandwidth input/output hardware and large amounts of local memory.

In the architecture shown in FIG. 2, two types of servers are used to respond to client requests for streaming media: a first server 106 that acts as a gateway computing device 106, and a plurality of second servers 108, 110 (two are shown) that have access to and can actually stream the requested data 112 to the client 102. In an embodiment, all client requests are received by the gateway computing device 106 which then determines which of the streaming servers 108, 110 should stream the media data 112 to the client 102. The gateway server 106 may be a separate and independent computing device as shown. Alternatively, the functions of the gateway server 106 may be performed by a program executing on a streaming server 108, 110.

In the embodiment shown, the streaming servers 108, 110 are in different physical locations and may be separated by many thousands of miles from each other as well as from the gateway 106 and the client 102. Thus, even though each computing device 102, 106, 108, 110 is connected to the Internet 104, the transmission routes between the different devices 102, 106, 108, 110 may vary significantly.

In addition, each streaming server 108, 110 is connected to multiple networks 114, 116, 118, 120 as shown. Each network 114, 116, 118, 120 uses a different network for accessing the Internet 104 for which a different cost is incurred if that network is used to transmit data. In the embodiment shown, each streaming server 108, 110 is provided with a flat rate network 114, 118 to the Internet (i.e., the operator is charged a flat rate regardless of the amount of data transmitted) and also a use-based rate network 116, 120 (e.g., the operator is charged based on the amount of data transferred via the network).

In an embodiment, each network 114, 116, 118, 120 may be provided by a different telecommunication service each operating a different communication network through which the Internet may be accessed. Not all of the networks 114, 116, 118, 120 may be capable of directly reaching the client 102. For example, any given network 114, 116, 118, 120 may only be able to connect to computing devices that may be able to directly access a local entry point of the network 114, 116, 118, 120. This is illustrated by the flat-rate network 118 of the streaming server 110 to which the client 102 is not directly connected. Thus, in the embodiment shown, the other three networks 114, 116, 120 represent the only available direct transmission routes between a streaming server 108, 110 and the client 102.

Thus, not all of the networks 114, 116, 118, 120 provide a transmission route between its streaming server 108, 110 and the client 102. In order to determine what networks 114, 116, 118, 120 can be used to transmit data to the client 102, the gateway server 106 maintains a community list 122 of past transmission routes between past clients and each streaming server 108, 110. The community list 122 may be stored on the gateway server 106 or may be remote from the gateway 106 in one or more locations and accessed as needed or both. The community list 122 includes information about what transmission routes have been used in the past to transmit and/or receive data from each client 102 that has interacted with the system in the past. The information may be collected by the system from the requests and responses sent between the clients and servers, may be retrieved from an external database of such information, or both. The information maintained by the gateway may be periodically updated or may be continuously refreshed to reflect the current status of the system.

In addition to records of past transmission routes, the community list 122 may also include general routing tables and information obtained from other sources. For example, the community list 122 could include information obtained from Border Gateway Protocol (BGP) routing tables. BGP routing tables provide general information about what networks allow connection to different known entry points on the Internet. In an embodiment, BGP routing tables may contain information published by individual routers on the Internet. BGP routing tables are but one example known to those of skill in the art of available routing information that could be used to determine what networks 114, 116, 118, 120 may provide transmission routes to a given client.

If the client 102 has interacted many times with the system previously, it is likely that the community list 122 will contain all of the available transmission routes between the servers 108, 110 of the system and the client 102. If the client 102 is unknown, or has not interacted extensively with the system in the past, then not all of the available transmission routes may be identified in the community list 122.

In some cases, a client 102 may be completely unknown to the system, as will occur the first time the client 102 contacts the gateway server 106 requesting to be streamed the data 112. In this case, the gateway 106 may only know the transmission route of the request from the client 102 to the gateway 106. In the embodiment shown, the gateway 106 can use the request's transmission route to determine what networks 114, 116, 118, 120 are likely to be available transmission routes between the streaming servers 108, 110 and the client 102 by accessing the community list 122. As part of the transmission route information in the community list 122 for each past client, the entry point of each client to the Internet (e.g., the first known computing device/network on the Internet that the client request was transmitted through) is identified. In an embodiment, the gateway 106 may search the community list 122 for past transmission routes to past clients 102 that have the same entry point to the Internet as the current client 102. Based on that information, the gateway 106 may identify that any available transmission routes to the clients with the same entry point are also available transmission routes to the current client 102.

The gateway server 106 also has access to network cost information 124. The network cost information 124 is obtained from or otherwise provided for each of the streaming servers 108, 110 and identifies the costs associated with each of the networks 114, 116, 118, 120 associated with each streaming server 108, 110. The network cost information 124 may be stored on the gateway server 106 or may be remote from the gateway 106 in one or more locations and accessed as needed or both. Thus, the gateway server 106 is capable of determining for any given client 102 an available transmission route between the client 102 and the streaming servers 108, 110 from the information in the community list 122. Given the available transmission routes, the gateway server 106 is then capable of determining which of the available transmission routes is the lowest cost transmission route from the network cost information 124.

In the embodiment shown, the gateway server 106 also has access to additional network information concerning the servers 108, 110 and client 102 and/or the networks to which they are attached. This additional network information may be stored in the community list 122 or in a separate data structure or structures (not shown). In an embodiment, the additional network information includes a physical location for each server 108, 110 and client 102 known to the system. The physical locations may be used to allow the gateway 106 to select the closest server to the client 102 in order to reduce the latency in the transmission of the data. In an embodiment, the actual physical location for the client 102 may not be determinable but may be estimated based on the physical location of the entry point for the client, which may be determined from information commonly available on the Internet.

The additional network information may also include the current status of each of the streaming servers 108, 110. Using the current load information, the gateway server 106 may take load-balancing into account when selecting a server 108, 110 to stream the data to the client 102.

Figure 3:
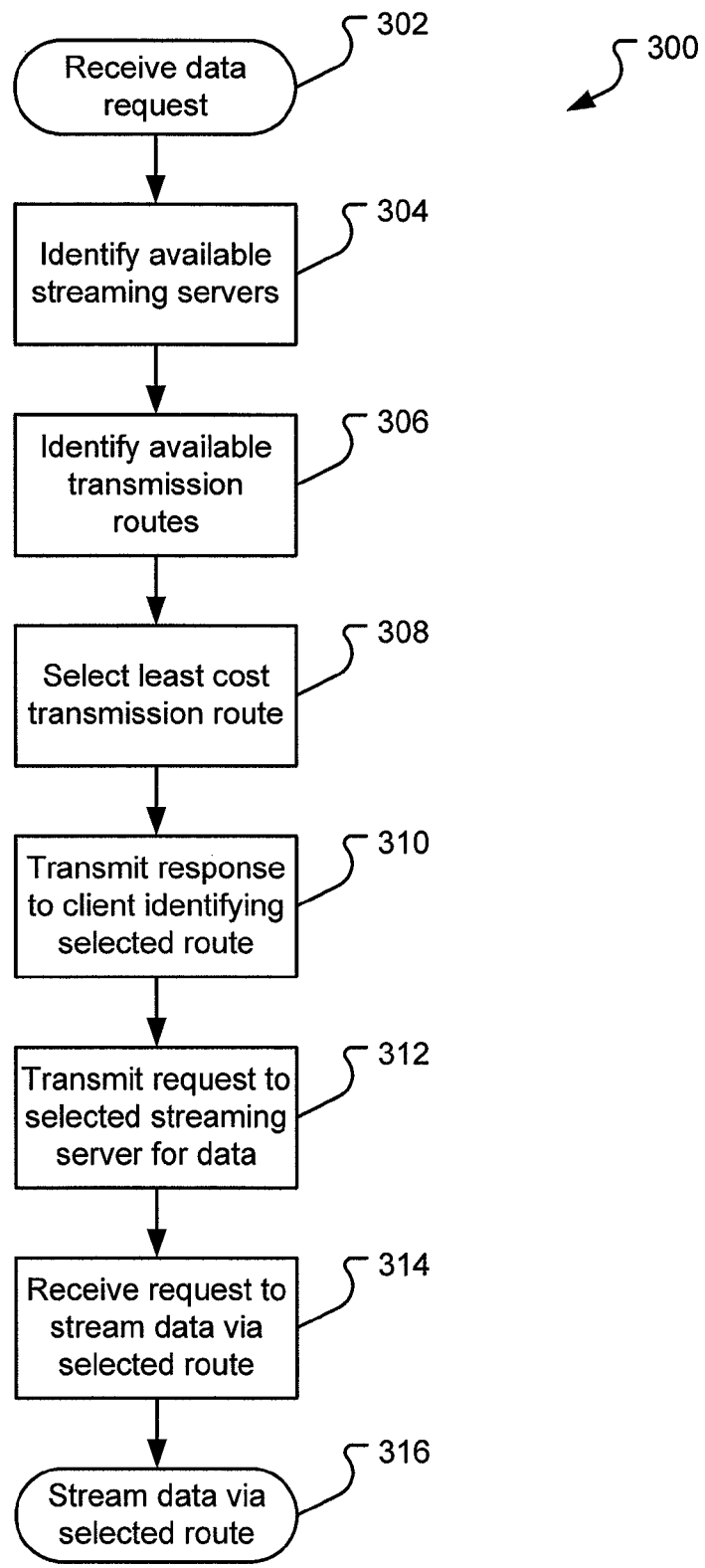
FIG. 3 is a flowchart of an embodiment of method for streaming data from a server computing device to a client computing device.

FIG. 3 is a flowchart of an embodiment of method for streaming data from a server computing device to a client computing device. In the method 300, a request to stream data to the client is received in a receive request operation 302. The request may have been transmitted by the client or may have been received from another source. In the embodiment shown, the request is received by a gateway server for processing. In an alternative embodiment, the request may be received by a gateway application executing on a server that is also a streaming server.

In response to the request, the gateway server accesses a streaming server database to determine what streaming servers are capable of streaming the requested data in an identify available streaming servers operation 304. Presumably, at least one server in the system has access to a copy of the requested data and can stream the data. If at least one server capable of streaming the data can not be found, an error may be returned to the client.

In response to the request, the gateway server accesses the community list to determine the available transmission routes from the available streaming servers in an identify available transmission routes operation 306. If the system has previously streamed data to the client, the transmission routes previously used to stream the data to the client may be used as the set of available transmission routes between available streaming servers and the client.

If the system has not previously streamed data to the client, the identify available transmission routes operation 306 may determine a network (e.g., an entry point) associated with the client based on information contained in the request and identify as available transmission routes those transmission routes previously used between the available streaming servers and the network. In an alternative embodiment, other methods of determining the available transmission routes may be used such as requesting the client to ping each of the available servers or vice versa.

The gateway server may maintain the community list or the list may be maintained by one or more other devices that are accessible to the gateway server. The community list may include information identifying transmission routes previously used to stream data to the client from each of the streaming servers in the system, information identifying transmission routes previously used to stream data to each network used as an entry point by clients from each streaming server in the system, or both.

After the available transmission routes have been determined, the gateway then selects the lowest cost transmission route based on the network cost information in a select least cost transmission route operation 308. The least cost transmission route may, but need not, be a flat rate network between a streaming server and the client. If no flat rate networks are available that provide a transmission route between an available server and the client, then the least cost use-based rate network is selected. Note that the least cost transmission route may be from a very distant streaming server relative to the client, even though a closer streaming server may be available.

In the embodiment shown, after the transmission route has been selected, a response is transmitted to the client in a respond operation 310. The response provides the selected transmission route to the client and directs the client to transmit a subsequent request for the data to the streaming server associated with the selected transmission route.

The client receives the response and transmits a second request for the data to the streaming server associated with the selected transmission route in a transmit second request operation 312. The request may be transmitted along the selected transmission route or may contain information identifying the selected transmission route to the server.

Regardless, the server receives the second request in a receive second request operation 314. In response to the second request, the server then streams the requested data to the client via the selected transmission route in a stream data operation 316.

Figure 4:
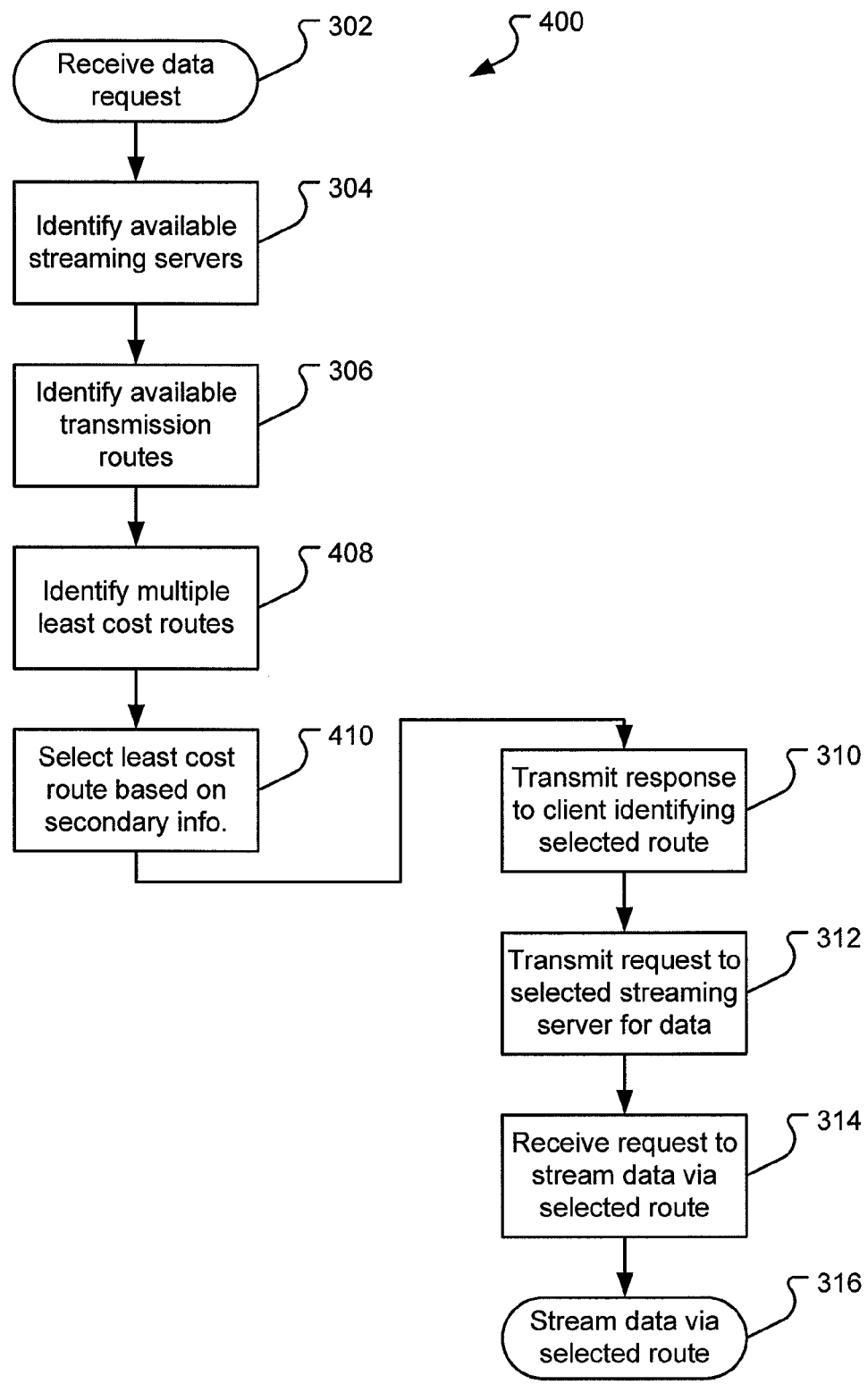
FIG. 4 is a flowchart of another embodiment of method for streaming data from a server computing device to a client computing device.

FIG. 4 is a flowchart of another embodiment of method for streaming data from a server computing device to a client computing device. In the method 400, a request to stream data to the client is received in a receive request operation 302, as discussed above. In response to the request, the gateway server performs an identify available streaming servers operation 304, and an identify available transmission routes operation 306 also as discussed above.

After the available transmission routes have been determined, the gateway then determines that at least two of the available transmission routes from different servers have a comparable cost in an identify multiple low cost transmission routes operation 408. This may be determined by the comparing the lowest cost transmission routes from each available server to some predetermined criteria. The predetermined criteria may be a predetermined cost range, such as less than a threshold cost so that available transmission routes are considered comparable if they are less than the threshold cost. The predetermined criteria may also be related to network type, such as for example all flat rate networks may be considered comparable regardless of their respective costs because the cost per amount of data is incremental and thus within a predetermined cost range.

Next, one of the comparable low cost transmission routes is selected based on a secondary factor in a select transmission route operation 410. In the select transmission route operation 410 at least one type of secondary information is retrieved for each of the comparable low cost transmission routes. In a first embodiment, the secondary information includes the physical location for each server associated with a comparable low cost transmission routes and the physical location (or estimated physical location) of the client. The transmission route from the closest server to the client is then selected.

In an alternative embodiment, latency information is obtained that estimates the latency between each server associated with a comparable low cost transmission routes and the client. The transmission route from the server with the lowest latency to the client is then selected.

In yet another embodiment, the current load on each server associated with a comparable low cost transmission route is obtained. The transmission route from the least-loaded server is then selected.

After the transmission route is selected, a response is transmitted to the client in a respond operation 310 and the method 400 proceeds as described above with reference to FIG. 3.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. For example, embodiments of the systems and methods described above may be used to transmit data to between any devices connected by multiple different cost transmission routes. For example, if a mobile device moves into a location serviced by two different networks, such as a high-cost cellular phone data network and the substantially free Bluetooth or wireless LAN network, the system and methods described above could automatically select the substantially free transmission route for all data transmissions to and from the mobile device until the mobile device moves out of that location. In that embodiment, the gateway may be an application on the mobile device or may be an application associated with the computing device with which the mobile device is communicating. Numerous other changes may be made which will readily suggest themselves to those skilled in the art and which are encompassed in the spirit of the invention disclosed and as defined in the appended claims.

What is claimed is:

1. A method comprising:
   receiving a request to stream data to a client computing device;
   selecting a first transmission route between a first server computing device and the client computing device from a set of available transmission routes between the first server computing device and the client computing device, said selection of the first transmission route based on a cost of the first transmission route relative to the cost of the other available transmission routes, and in accordance with attributes of the first server computing device and the client computing device, said attributes, are associated with the cost of the other available transmission routes, said attributes comprise latency information between the first server computing device and the client computing device, distance between the first server computing device and client computing device, network information associated with the first server computing device, and a current load on the first server computing device;
   determining that the first transmission route is within a predetermined cost range respective of a threshold among the set of available transmission routes;
   estimating a communication latency between the client computing device and the first server computing device; and
   streaming the data from the first server computing device to the client computing device via the first transmission route, said first server computing device streaming the data based on the estimated communication latency.

2. The method of claim 1 further comprising:
   if the first server computing device has previously streamed data to the client computing device, identifying transmission routes previously used to stream data to the client computing device as the set of available transmission routes between the first server computing device and the client computing device.

3. The method of claim 1 further comprising:
   if the first server computing device has not previously streamed data to the client computing device,
      determining a network associated with the client computing device based on information contained in the request;
      identifying the set of available transmission routes as those transmission routes available between the first server computing device and the network; and
      maintaining information identifying transmission routes previously used to stream data to the network from the first server computing device.

4. The method of claim 1 wherein selecting further comprises:
   identifying a plurality of server computing devices capable of streaming the data to the client computing device, the plurality of server computing devices including the first server computing device;
   identifying the set of available transmission routes from each of the plurality of server computing devices to the client computing device.

5. The method of claim 4 further comprising:
   selecting, as the first transmission route, the lowest cost transmission route in the set of available transmission routes from each of the plurality of server computing devices to the client computing device.

6. The method of claim 4 further comprising:
determining that the first transmission route from the first server computing device and one or more other available transmission routes from at least one other of the plurality of server computing devices to the client computing device are within the predetermined cost range.

7. The method of claim 6 further comprising:
determining that the first server computing device is physically closer to the client computing device than the at least one other of the plurality of server computing devices based on information contained in the request; and
selecting the first server computing device to stream the data to the client computing device.

8. The method of claim 6 further comprising:
estimating a communication latency between the client computing device and the at least one other of the plurality of server computing devices.

9. The method of claim 2 further comprising:
maintaining information identifying transmission routes previously used to stream data to the client computing device from the first server computing device.

10. The method of claim 1 further comprising:
transmitting a response to the client computing device, the response directing the client computing device to transmit a direct request to the first server, the direct request being a request to stream the data to the client computing device via the first transmission route.

11. A system comprising:
a first server computing device having access to a copy of the data, wherein a set of available transmission routes exist between the first server computing device and the client computing device over which the first server computing device can stream the data to the client computing device;
a gateway, implemented by at least one processor, that receives a data request from the client computing device and that selects a first transmission route from the set of available transmission routes between the first server computing device and the client computing, the gateway selects the first transmission route from the set of available transmission routes based on transmission cost associated with each of the set of available transmission routes being within a predetermined cost range which is respective of a threshold among the set of the available transmission routes, and in accordance with attributes of the first server computing device and the client computing device, said attributes are associated with the transmission cost of the set of available transmission routes, said attributes comprise latency information between the first server computing device and the client computing device, distance between the first server computing device and client computing device, network information associated with the first server computing device, and a current load on the first server computing device; and
the first server computing device streams the data to the client computing device via the first transmission route based on an estimated latency between the client computing device and the first server computing device.

12. The system of claim 11 wherein the gateway is remote from the first server computing device and the client computing device.

13. The system of claim 11 wherein the gateway further transmits a response to the client computing device, the response directing the client computing device to transmit a direct request to the first server, the direct request being a request to stream the data to the client computing device via the first transmission route.

14. The system of claim 11 further comprising:
a plurality of independent server computing devices remote from each other and each having access to a copy of the data, the plurality including the first server computing device, wherein each of the plurality of server computing devices has a set of available transmission routes between the respective server computing device and the client computing device, each transmission route being associated with a transmission cost,
wherein the first transmission route selected by the selection module is a least cost transmission route between the plurality of server computing devices having access to a copy of the data and the client computing device.

15. The system of claim 13 further comprising:
cost information associating a transmission cost with each one of the set of available transmission routes between the first server computing device and the client computing device, the cost information accessible by the gateway.

16. The system of claim 14 wherein the gateway selects the first server computing device based on the transmission cost associated with first transmission route.

17. The system of claim 14 wherein the gateway selects the first server computing device based on the transmission cost associated with first transmission route and a latency associated with the first transmission route relative to latencies associated with the other available transmission routes.

18. The system of claim 14 wherein the gateway selects the first server computing device based on the transmission cost associated with first transmission route and a proximity of the first server computing device to the client computing device relative to proximities of the other server computing devices to the client computing device.

19. A non-transitory computer-readable storage medium tangibly encoded with computer-executable instructions for, when executed by a computing device, performing a method comprising:
receiving a request to stream data to a client computing device;
selecting a first transmission route between a first server computing device and the client computing device from a set of available transmission routes between the first server computing device and the client computing device, said selecting of the first transmission route based on a cost of the first transmission route relative to costs of the other available transmission routes, and in accordance with attributes of the first server computing device and the client computing device, said attributes are associated with the cost of the other available transmission routes, said attributes comprise latency information between the first server computing device and the client computing device, distance between the first server computing device and client computing device, network information associated with the first server computing device, and a current load on the first server computing device;
determining that the first transmission route is within a predetermined cost range respective of a threshold among the set of available transmission routes;
estimating a communication latency between the client computing device and the first server computing device; and
transmitting a response to the client computing device from the first server computing device, the response directing the client computing device to transmit a direct request to the first server, the direct request being a request to stream the data to the client computing device via the first transmission route, said first server computing device streaming the data based on the estimated communication latency.

20. The non-transitory computer-readable storage medium of claim 19 wherein selecting further comprises:
   identifying a plurality of server computing devices capable of streaming the data to the client computing device, the plurality of server computing devices including the first server computing device;
   identifying the set of available transmission routes from each of the plurality of server computing devices to the client computing device; and
   selecting, as the first transmission route, the lowest cost transmission route in the set of available transmission routes from each of the plurality of server computing devices to the client computing device.

* * * * *